Figure 1:
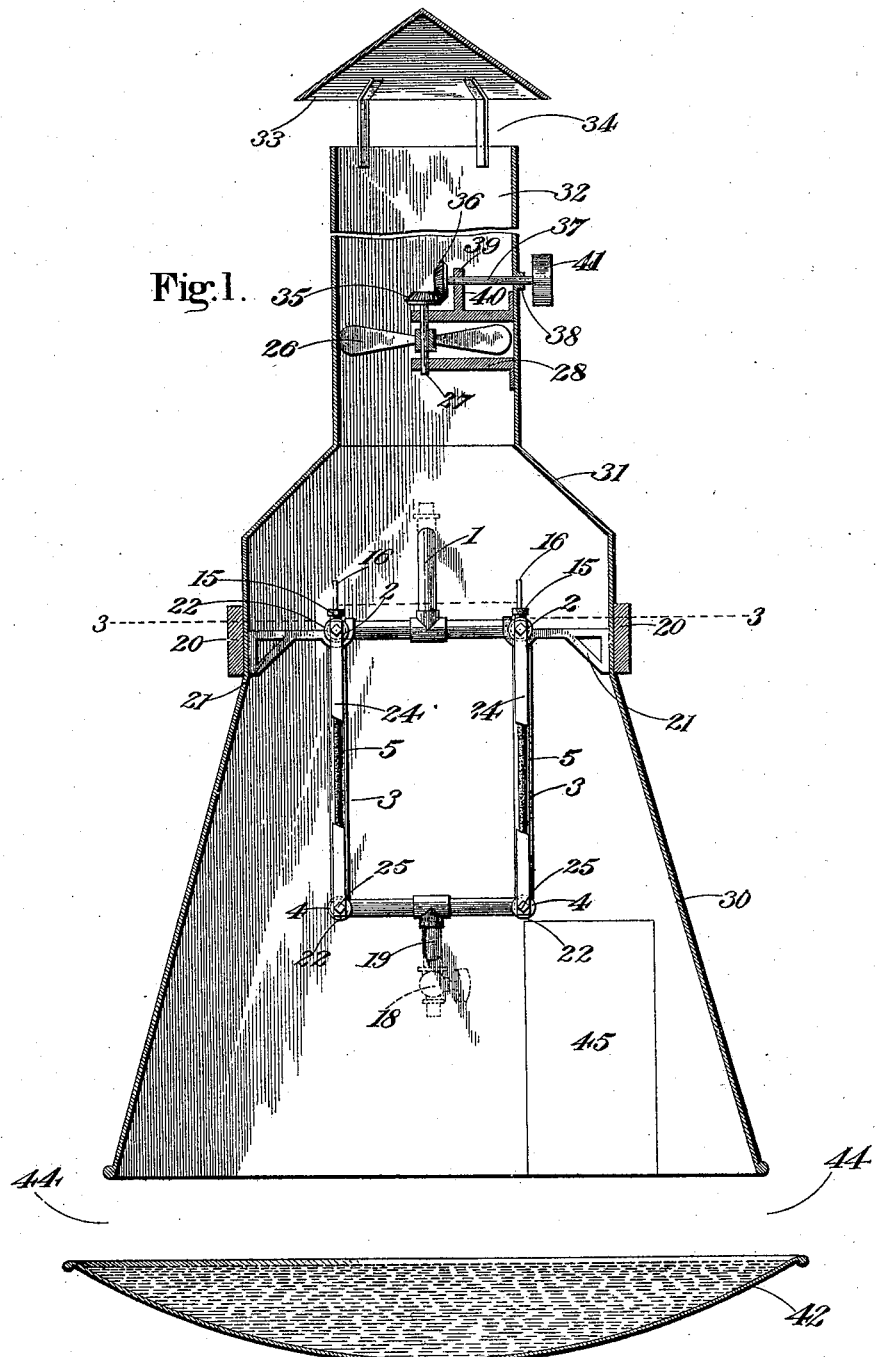

(No Model.) 2 Sheets—Sheet 1.

C. BARUS.
APPARATUS FOR AERATING AND COOLING LIQUIDS.

No. 574,375. Patented Jan. 5, 1897.

WITNESSES
INVENTOR
Carl Barus.
By Joseph L. Atkins
Attorney (No Model.) 2 Sheets—Sheet 2.
C. BARUS.
APPARATUS FOR AERATING AND COOLING LIQUIDS.
No. 574,375. Patented Jan. 5, 1897.
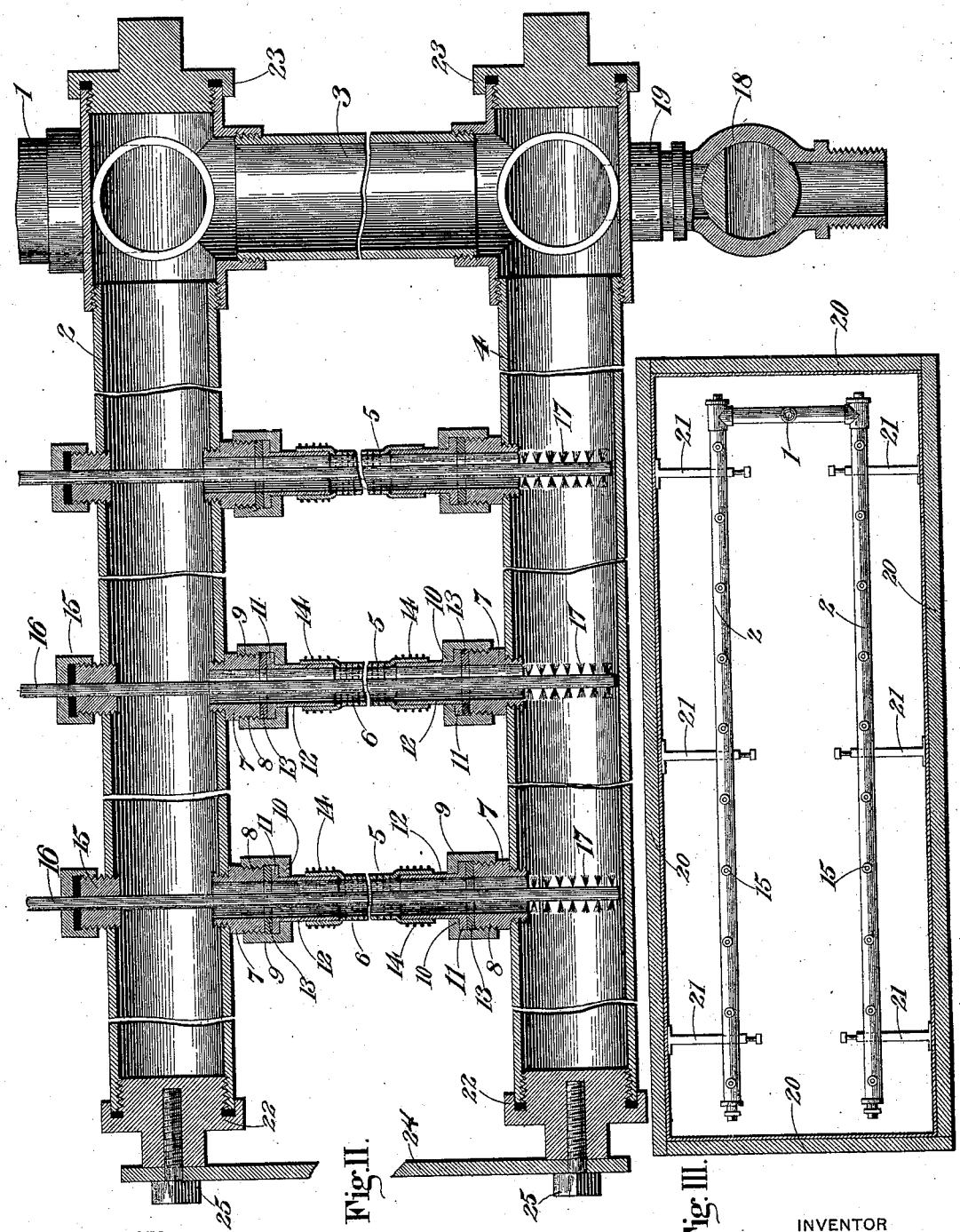
Fig. II. Fig. III.
WITNESSES
M. E. Fowler
Sm. Acker
INVENTOR
Carl Barus
By Joseph T. Atkins
Attorney

UNITED STATES PATENT OFFICE.

CARL BARUS, OF WASHINGTON, DISTRICT OF COLUMBIA.

APPARATUS FOR AERATING AND COOLING LIQUIDS.

SPECIFICATION forming part of Letters Patent No. 574,375, dated January 5, 1897.

Application filed October 8, 1895. Serial No. 565,040. (No model.)

*To all whom it may concern:*

Be it known that I, CARL BARUS, of the city of Washington, in the District of Columbia, have invented a certain new and useful Method of and Apparatus for Aerating Liquids, of which the following is a specification, reference being had to the accompanying drawings.

The object of my invention is to produce a novel and improved apparatus for aerating liquids, which, although not exclusively adapted for employment in the manufacture of beer, is especially applicable to that purpose.

Referring, therefore, to the ordinary process of manufacture of beer, it is necessary to state, by way of explanation, that the hot liquor by the ordinary method is brought to a certain consistency in the hop-jacks, after which it is cooled, aerated, and conveyed away to the fermentation-tanks. If the consistency of the liquor in the malt-tubs or hop-jacks were thinner, the properties of the malt and the hops would be more thoroughly exhausted than when the liquor is thick.

By my invention the liquid is simultaneously condensed by evaporation, cooled, and aerated, and a comparatively thin liquid being available the properties of the mash may be thoroughly exhausted before it is dumped.

To the accomplishment of the above treatment of the liquid my invention consists in novel apparatus for exposing the liquid in a finely-comminuted condition to a current or currents of air, whereby the temperature of the liquid is lowered through the absorption of its heat by the air-currents and its aeration and condensation are accomplished.

Figure I is a central vertical section of one form of my apparatus complete. Fig. II is a vertical transverse sectional view of my atomizer or comminuter. Fig. III is a transverse section of my apparatus complete, as if taken on line 3 3 of Fig. I.

Referring to the figures on the drawings, 1 indicates an influx-pipe communicating with an upper supply branch pipe 2 and through a connecting-pipe 3 with a lower supply branch pipe 4. (See Fig. II.) The upper and lower branch supply-pipes may be made in the general rectangular plan shown in Fig. III of the drawings, or they may be arranged circularly or in any other suitable manner.

5 indicates each one of a series of sections of elastic or expansible tubing, made, for example, of rubber hose, which at short intervals connect the upper and lower branch supply-pipes. Each section is pierced with a multitude of minute perforations or punctures. (Indicated on an exaggerated scale by dots 6 in the drawings.) These perforations may be so minute and pore-like as to be almost invisible to the naked eye when the wall of the tube is in the normal state. When the tube, however, is expanded by pressure of a fluid from within, the perforations 6 permit the escape of the imprisoned fluid in the most finely-comminuted state. The porous sections 5 may be united to the pipe-sections 2 and 4 by any suitable means, the pipe-couplings illustrated being sufficient for the purpose. Such couplings consist of nipples 7, screwed into the walls of the pipes 2 and 4, respectively. They are provided with exterior screw-threads 8, which engage with the interior screw-threads of a retaining-cap 9, whose interior flange 10 secures the exterior flange 11 of a thimble 12 against a gasket 13, that is seated against the end of the nipple 7. The thimble 12 is secured directly to the hose-sections by suitable means, as, for example, wrapping wires 14.

In order to keep the porous tubes clean, I prefer to provide opposite to each one of them a stuffing-box 15, within which works the stem 16 of a brush 17. The brush is of a size to fit the interior of the tube 5 and may be utilized at any time by the reciprocation of the stem 16 through the stuffing-box 15 to cleanse the interior of the tube 5.

18 indicates a stop-cock, and 19 a drain-pipe, in which it is located. The drain-pipe communicates with the pipe 4 and is adapted, when the stop-cock 18 is open, to drain the branch pipes 2 and 4 and the connecting-pipes 3.

The above-described apparatus may be supported upon a suitable frame, a portion of which is indicated by the timbers 20, which are preferably copper-lined.

21 indicates brackets secured to the timbers and which, directly supporting the branch pipes 2, sustain the atomizer or comminuter in the elevated position. When the atomizer is set upon the brackets, the opposite ends of the branch pipes 2 and 4, respectively, may be closed, as by screw-plugs 22 and 23, respectively. The plugs 22 may be united by suspending-braces 24, (shown broken away in Figs. I and II,) secured to them, as by screw-bolts 25. The braces 24 afford means for supporting the projecting extremities of the branch pipe 4.

In connection with the atomizing apparatus above described I employ a suitable draft-compelling mechanism, and also, by preference, draft-directing apparatus. The draft-compelling mechanism may be varied in many ways and may be of many different kinds, but a simple variety consists of an ordinary fan 26, carried on a shaft 27 and secured to a frame 28. The shaft 27 may be driven at a suitable rate of speed by suitable means. The draft-directing apparatus may consist of a copper envelop 30, which, being preferably bell-shaped, narrows at its upper end 31 toward a chimney 32. The chimney 32 is preferably surmounted by a hood 33, which defines an air-outlet 34 between it and the top of the chimney. If the chimney is employed, the frame 28 may be fastened to one side of it, as illustrated in Fig. I. The shaft 27 may be provided with a beveled gear 35, which meshes with a beveled gear 36 upon a shaft 37, mounted in suitable bearings 38 and 39 in the wall of the chimney and upon a stud 40 on the frame 28, respectively. On the outside of the chimney the shaft 37 carries a belt-pulley 41, which affords means for driving the fan.

42 indicates a shallow vat located underneath the atomizer and (if the envelop is employed) of a little greater diameter than it. The vat is designed to receive the cooled condensed aerated liquid from within the envelop 30 and is provided with an efflux-pipe 43, adapted to conduct the liquid away for use as required.

44 indicates an air-inlet space between the vat 42 and the bottom of the envelop 30.

The operation of my apparatus is as follows: The liquid to be treated is supplied through the pipe 1 to the pipes 2, 3, and 4 under a pressure sufficient to force the liquid through the punctures 6 of the series of expansible pipe-sections 5. The draft-compelling apparatus, as, for example, the fan 26, being in operation and the draft-directing mechanism being employed, a strong upward current of naturally cool or artificially-cooled air is drawn through the opening 44 up through the envelop 30 and the chimney 32 and is discharged through the air-outlet 34. Into the current of air thus supplied the liquid in the comminuted state from the multitude of punctures 6 is discharged in all directions throughout the envelop 30. By this means the liquid is simultaneously cooled, condensed, and aerated and falls into the vat 42, ready to be conveyed away for use or to be subjected to the next step of the process, which in beer manufacture is that of fermentation. The source of supply of liquid to the pipe 1 in beer manufacture is the strainers of the hop-jacks, but, although the liquid is strained prior to its delivery to the atomizer, it is liable to convey material which in time may clog up the pores or punctures of the tubes 5. For that purpose I provide in each tube, as above specified, a brush 17, by means whereof the tubes 5 may be kept clean. For the purpose of actuating the brushes, as required, the envelop 30 may be constructed with a door or doors 45, which permits access of an operator to the interior of the envelop. If the material washed down by the brushes 17 accumulates to excess, a portion of the liquor may be drawn off through the pipe 19, thus cleansing the pipes 2, 3, and 4 of such impurities.

What I claim is—

1. In liquid-comminuting apparatus, the combination with draft-compelling apparatus, of a liquid-supply pipe and a punctured or porous, elastic tube communicating therewith, substantially as set forth.

2. In liquid-comminuting apparatus, the combination with a pair of liquid-supply pipes and an intermediate punctured or porous, expansible tube connecting the supply-pipes, substantially as set forth.

3. The combination with a pair of liquid-supply pipes, of an intermediate punctured, porous or expansible tube communicating with each, a brush movable in the tube, a stem projecting through one of the pipes, and a stuffing-box in the pipe around the stem, substantially as set forth.

4. The combination with liquid-supply pipes and punctured or porous, expansible tubes communicating therewith, of a drain-pipe adapted to readily drain the supply-pipes, and a stop-cock controlling the drain-pipe, substantially as set forth.

In testimony of all which I have hereunto subscribed my name.

CARL BARUS.

Witnesses:
G. W. BALLOCH,
W. L. LANNING.